US010409335B2

(12) United States Patent
Wood et al.

(10) Patent No.: US 10,409,335 B2
(45) Date of Patent: Sep. 10, 2019

(54) METHOD TO RECOVER PERMANENT SET IN A FOLDABLE DISPLAY

(71) Applicant: MOTOROLA MOBILITY LLC, Chicago, IL (US)

(72) Inventors: Charles Wood, Highland Park, IL (US); Alberto Cavallaro, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 307 days.

(21) Appl. No.: 15/375,986

(22) Filed: Dec. 12, 2016

(65) Prior Publication Data

US 2018/0164854 A1 Jun. 14, 2018

(51) Int. Cl.
*G05D 23/00* (2006.01)
*G06F 1/16* (2006.01)
*G05D 23/19* (2006.01)

(52) U.S. Cl.
CPC ............ *G06F 1/1677* (2013.01); *G05D 23/19* (2013.01); *G06F 1/1616* (2013.01); *G06F 1/1681* (2013.01)

(58) Field of Classification Search
CPC .... G06F 1/1677; G06F 1/1681; G06F 1/1616; G05D 23/19

USPC .......................................................... 700/300
See application file for complete search history.

(56) References Cited

U.S. PATENT DOCUMENTS

2013/0265260 A1* 10/2013 Seo .......................... G06F 3/041
345/173
2017/0228094 A1* 8/2017 Wood .................... G06F 3/0418

OTHER PUBLICATIONS

Osswald, Tim, Understanding Polymer Processing, Chapter 2: Mechanical Behavior of Polymers, Hanser Publishers (2010), Cincinnati.

* cited by examiner

*Primary Examiner* — Vu A Vu
(74) *Attorney, Agent, or Firm* — Yudell Isidore PLLC

(57) ABSTRACT

A method, electronic device, and computer program product for countering a semi-permanent deformation at an area of a foldable display. The method monitors a time duration that the display is in the angled position. The method includes measuring a temperature associated with at least one area of the display while the display is in the angled position. In response to the display remaining in the angled position for greater than a calculated period of time, the method determines a degree of semi-permanent deformation associated with the at least one area of the display. The method further triggers an increase in temperature at the at least one area of the display to counter the degree of semi-permanent deformation.

20 Claims, 8 Drawing Sheets

METHOD TO RECOVER PERMANENT SET IN A FOLDABLE DISPLAY

BACKGROUND

1. Technical Field

The present disclosure generally relates to electronic displays and in particular to foldable electronic displays.

2. Description of the Related Art

Polymeric materials, commonly called plastics, demonstrate the ability to sustain a higher strain than most metallic materials. The ability to sustain higher strain is primarily due to the amorphous or non-crystalline construction which allows the polymer molecules to exhibit some flexibility and mobility when exposed to positional strain. Plastics have become useful in applications where metals and glass would fail. Applications such as electronic displays, and more specifically, plastic organic light emitting diode displays (OLED), have become a popular choice for integrating into the design of mobile phones, digital cameras, virtual reality headsets, tablets, laptops, and televisions. However, the ability of polymeric materials to exhibit flexibility and mobility when exposed to positional strain is negated by the damage incurred by displays during multiple bending cycles and during exposure to long periods of loading.

BRIEF DESCRIPTION OF THE DRAWINGS

The description of the illustrative embodiments is to be read in conjunction with the accompanying drawings, wherein.

DETAILED DESCRIPTION

Figure 1:
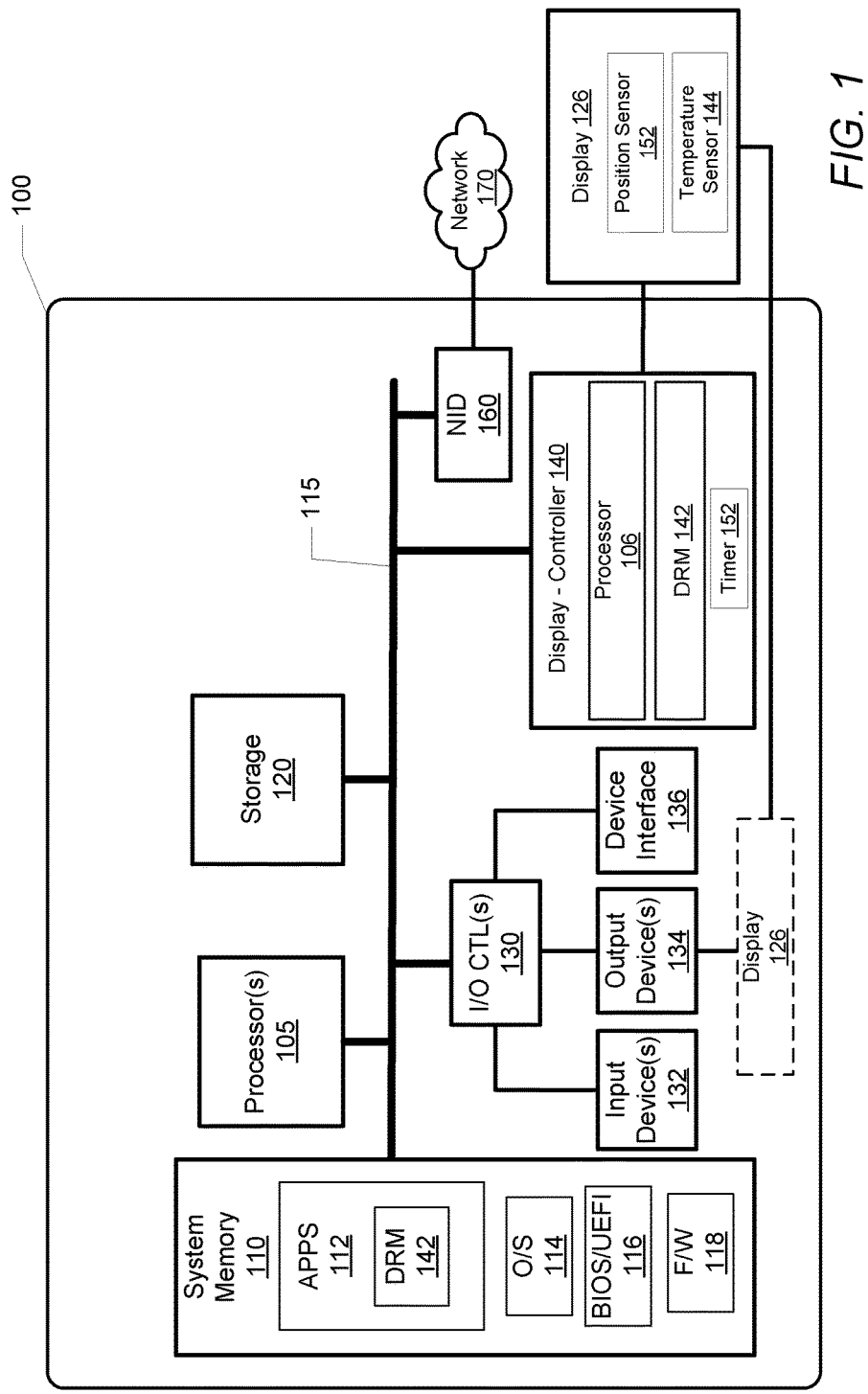
FIG. 1 provides a block diagram representation of an example data processing system within which certain aspects of the disclosure can be practiced, in accordance with one or more embodiments.

Disclosed are a method, electronic device, and computer program product for countering a semi-permanent deformation at an area of a foldable display. The method includes monitoring a time duration that the display is in an angled/folded position. The method further includes measuring a temperature associated with at least one area of the display while the display is in the angled position. In response to the display remaining in the angled position for greater than a calculated period of time, the method includes measuring a degree of semi-permanent deformation associated with the at least one area of the display. The method further includes triggering an increase in temperature at the at least one area of the display to counter the degree of semi-permanent deformation.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices (100 and 200) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of an example data processing system (DPS) 100, within which one or more of the described features of the various embodiments of the disclosure can be implemented. For example, a data processing system may be a handheld device, personal computer, a server, a network storage device, or any other suitable device and may vary in size, shape, performance, functionality, and price.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid-state drive. The one or more software and/or firmware modules within storage 120 can be loaded into system memory 110 during operation of DPS 100. As shown, system memory 110 can include therein a plurality of software and/or firmware modules including application(s) 112, operating system (O/S) 114, basic input/output system/unified extensible firmware interface (BIOS/UEFI) 116 and other firmware (F/W) 118. For example, DPS 100 includes display recovery module (DRM) 142. DRM 142 may be provided as an application that is optionally located within system memory 110 and executed by processor 105. Within this embodiment, processor 105 executes DRM 142 to provide the various methods and functions described herein. For simplicity, DRM 142 is illustrated and described as a stand-alone or separate software/firmware/logic component, which provides the specific functions and methods described herein. However, in at least one embodiment, DRM 142 may be a component of, may be combined with, or may be incorporated within OS 114, and/or with one or more applications 112. Additional aspects of DRM 142, and functionality thereof, are presented within the description of FIGS. 3-6.

The various software and/or firmware modules have varying functionality when their corresponding program code is executed by processor(s) 105 or other processing devices within DPS 100. DPS 100 further includes one or more input/output (I/O) controllers 130, which support connection by, and processing of signals from, one or more connected input device(s) 132, such as a keyboard, mouse, touch screen, or microphone. I/O controllers 130 also support connection to and forwarding of output signals to one or more connected output devices 134, such as display 126 and audio speaker(s). Display 126 may be, for example, an organic light emitting screen and an organic light emitting diode (LED) display. Display 126 comprises one or more polymer layers. The polymer layers may be processed as a stack of polymer layers. Additionally, display 126 is foldable. That is, display 126 includes one or more hinge areas that bend and/or fold. Position sensor 150 and temperature sensor 144 are located within display 126 and/or the casing thereof. More specifically, position sensor 150 and temperature sensor 144 are in close proximity to the hinge area associated with display 126.

Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 136 can be utilized to enable data to be read from or stored to additional devices (not shown) for example a compact disk (CD), digital video disk (DVD), flash drive, or flash memory card. In one or more embodiments, device interfaces 136 can further include General Purpose I/O interfaces, such as an Inter-Integrated Circuit ($I^2C$) Bus, System Management Bus (SMBus), and peripheral component interconnect (PCI) buses.

DPS 100 further comprises a network interface device (NID) 160. NID 160 enables DPS 100 to communicate and/or interface with other devices, services, and components that are located external (remote) to DPS 100. These devices, services, and components can interface with DPS 100 via an external network, such as example network 170, using one or more communication protocols. Network 170 can be a local area network, wide area network, personal area network, and the like, and the connection to and/or between network and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

DPS 100 also includes display controller 140, which includes processor 106 and DRM 142, which executes on processor 106. Display controller 140 is communicatively coupled to temperature sensor 144, and position sensor 150 within display 126. Processor 106 is optionally included within display controller 140 to execute DRM 142, thereby enabling the functionalities of display controller 140. In another embodiment, processor 105 executes DRM 142 and enables the functionalities of display controller 140. Display controller 140 also includes timer 152 communicatively coupled to position sensor 150, which can be a separate device or a software module executed on processor 106. Additional aspects of device controller 140, and functionality thereof, are presented within the description of FIGS. 3-7.

Figure 2A:
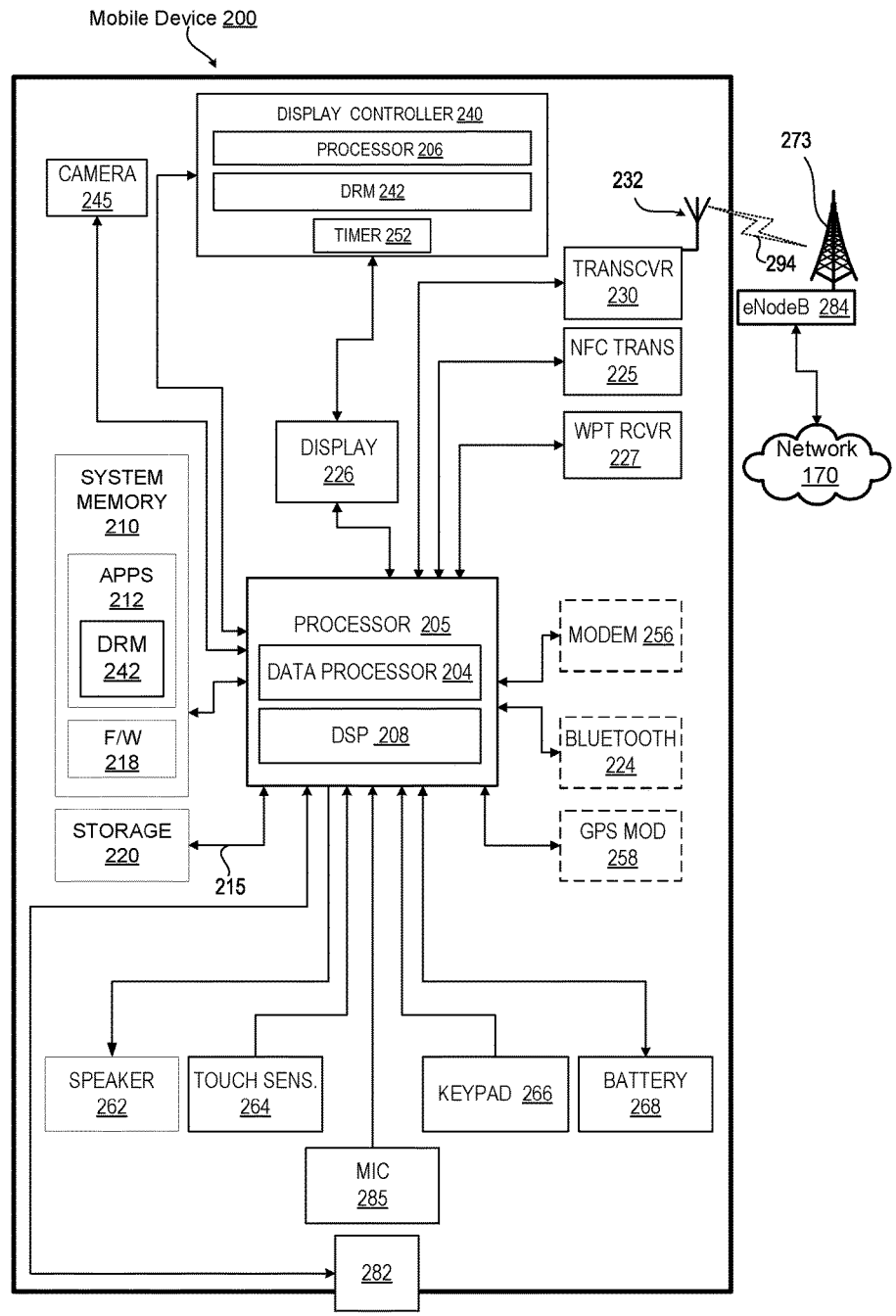
FIG. 2A illustrates a mobile device within which certain aspects of the disclosure can be practiced, in accordance with one or more embodiments.

With reference now to FIG. 2A, there is illustrated an example mobile device 200. Mobile device 200 includes at least one processor integrated circuit, processor 205. Included within processor 205 are data processor 204 and digital signal processor (DSP) 208. Processor 205 is coupled to system memory 210 and non-volatile storage 220 via a system communication mechanism, such as system interconnect 215. System interconnect 215 can be interchangeably referred to as a system bus, in one or more embodiments. One or more software and/or firmware modules can be loaded into system memory 210 during operation of mobile device 200. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor 205 or by secondary processing devices within mobile device 200.

Processor 205 supports connection by and processing of signals from one or more connected input devices such as camera 245, speaker 262, touch sensor 264, microphone 285, keypad 266, and display 226. Additionally, in one or more embodiments, one or more device interfaces 282, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes Bluetooth transceiver 224 and global positioning system module (GPS MOD) 258, all of which are communicatively coupled to processor 205.

Modem 256, Bluetooth transceiver 224, and GPS MOD 258 enable mobile device 200 and/or components within mobile device 200 to communicate and/or interface with other devices, services, and components that are located external to mobile device 200.

Mobile device 200 is presented as a wireless communication device. As a wireless device, mobile device 200 can transmit data over wireless network 170. Mobile device 200 includes transceiver 230, which is communicatively coupled to processor 205 and to antenna 232. Transceiver 230 allows for wide-area or local wireless communication, via wireless signal 294, between mobile device 200 and evolved node B (eNodeB) 284, which includes antenna 273. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 230, antenna 232, wireless signal 294, antenna 273, and eNodeB 284. Mobile device 200 additionally includes near field communication transceiver (NFC TRANS) 225 wireless power transfer receiver (WPT RCVR) 227.

As provided by FIG. 2A, mobile device 200 additionally includes display controller 240. Display controller 240 includes an optional processor 206 and DRM 242 which executes on processor 206. In at least one embodiment, DRM 242 may be a component of, may be combined with, or may be incorporated within one or more applications 212. Display controller 240 is communicatively coupled to position sensor 250 and temperature sensor 244 within display 226 (illustrated in FIG. 2.B). Display controller 240 also includes timer 252, which can be a separate device or a software module executed on processor 206. Timer 252 can include a back-up battery. The back-up battery can enable timer 252 to monitor the time duration display 226 is in an angled position when mobile device 200 is shut-down. Display controller 240 and components thereof are further discussed in FIG. 2B.

Figure 2B:
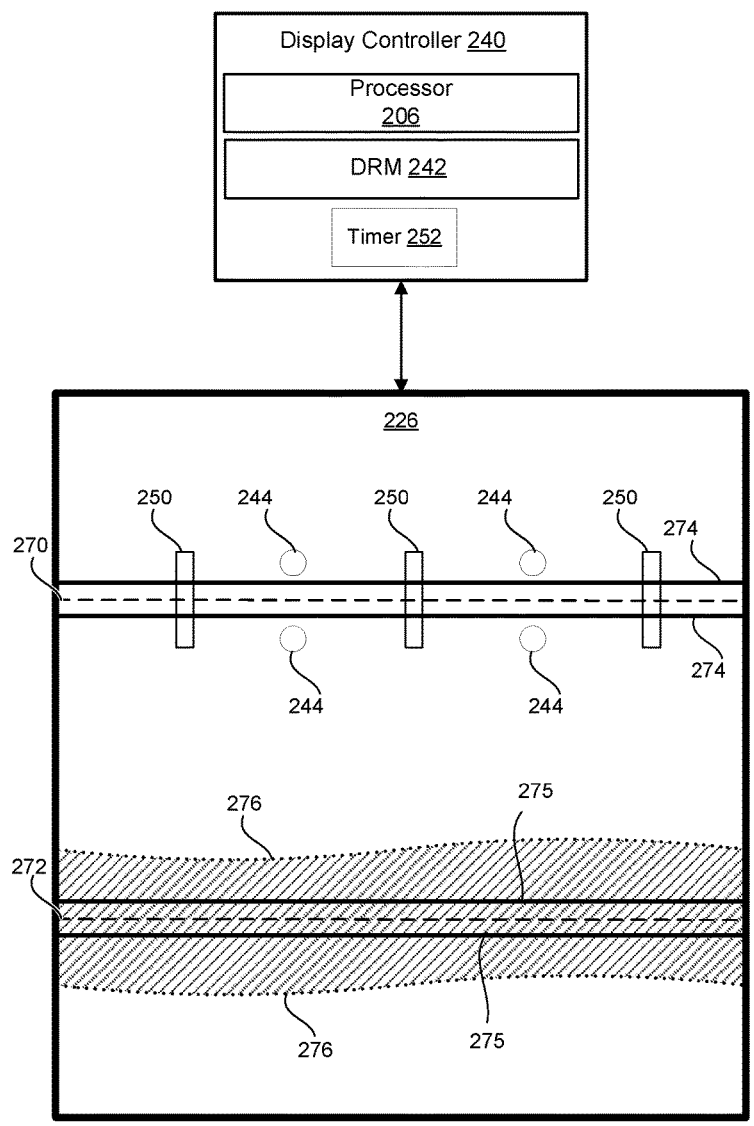
FIG. 2B illustrates a display coupled to a controller associated with the mobile device within which certain aspects of the disclosure can be practiced, in accordance with one or more embodiments.

Turning now to FIG. 2B, there is illustrated a display assembly that includes display controller 240 described in FIG. 2A. Display controller 240 is communicatively coupled to display 226, and the components thereof. Display 226 includes hinge 270, hinge 272, thermal element 274 and 275, and heat generating area 276. Physically positioned within or associated with display 226 are temperature sensor 244 and position sensor 250. More specifically, position sensor 250 and temperature sensor 244 are in close proximity to hinge area 270. Although not shown, hinge area 272 also includes a position sensor and temperature sensor similar to that of position sensor 250 and temperature sensor 244.

Display 226 is a foldable display. Similar to display 126, display 226 may be, for example, an organic light emitting screen and an organic light emitting diode (LED) display. Display 226 comprises one or more polymer layers. The polymer layers may be processed as a stack of polymer layers. Display 226 includes at least one hinge area, for example, hinge 270 and hinge 272. Display 226 bends and/or folds on or near hinge 270 and 272.

Thermal element 274 and 275 is a part of a heat generating subsystem that is juxtaposed to at least one area of display 226 to produce heat and thus increase the temperature within a predetermined area of display 226. Predetermined area of display 226 is an area in close proximity to hinge 270 that has endured, or is at risk of enduring semi-permanent deformation. Similarly, thermal element 275 is located in close proximity to hinge 272. Thermal element 274 and 275 may be a heating coil, heating grid, imbedded heating wire, or any heating device that enables an increase in temperature in proximity to hinge 270 and 272, respectively. In the example of FIG. 2B, thermal element 275 generates heat to an area in proximity to hinge 272, resulting in heat dissipation within an area in close proximity to thermal element 275, for example heat generating area 276.

Display controller 240 optionally includes processor 206. In one embodiment, processor 206 executes instruction to perform the functionality provided by display controller 240. In another embodiment, the local processor, processor 205, of mobile device 200 executes the instruction to perform the functionality provided by display controller 240.

Position sensor 250, communicatively coupled to display controller 240, detects when display 226 is folding, bending, or in a position that causes at least a part of display 226 to be at an angle that promotes deformation of one or more polymer layers. Timer 252 is a module that is associated with position sensor 250. Timer 252 monitors a time duration that display device 226 is in the angled position. Temperature sensor 244 detects and monitors temperatures associated with at least one predetermined area of display device 226.

According to one aspect, display controller 240 is communicatively coupled to display 226. In the presented embodiment, mobile device 200 includes display controller 240 that performs several of the processes described herein relative to the bendable display 226. In one embodiment, display controller 240 includes or is communicatively coupled to a persistent storage or memory within which DRM 242 is stored. In one embodiment, display controller 240 includes and/or provides timer 252. In an alternate embodiment, timer 252 can be provided as one of several executable, functional modules within DRM 242.

During operation of mobile device 200, DRM 242 is executed by display controller 240 to provide certain of the functional features described herein. DRM 242 determines the extent of semi-permanent deformation that occurs at a predetermined area of display 226, which is the area surrounding hinge 270 and 272, in the current illustration. In response to the detection of deformation at a predetermined area of display 226, DRM 242 enables thermal element 275 to generate heat to the predetermined area by applying electrical energy to thermal element 275. In the illustrated example, the temperature is increased at heat generating area 276 to reverse the semi-permanent deformation associated with display 226.

In one embodiment, the time duration and heat dissipated by thermal element 275 is proportional to the extent of the deformation associated with display 226. The extent of semi-permanent deformation may be based on polymeric behavior of polymers associated with display 226, as well as time and temperature aspects associated with display 226. The extent of semi-permanent deformation may also be determined by the length of time display 226 is detected to be in an angled and/or folded position, as determined by position sensor 250 and timer 252. Semi-permanent deformation may additionally be associated with an ambient temperature detected at a predetermined area of display 226. DRM 242 (or an associated memory component) may store a history of temperatures, stresses endured, detected force, or similar data to determine an extent of semi-permanent deformation that has occurred or is occurring at predetermined areas of display 226. Additionally, DRM 242 stores relaxation modulus curves and similar data related to the polymeric behavior of the one or more polymeric components. DRM 242 utilizes the stored data to calculate a temperature application and time duration needed to counter a semi-permanent deformation associated with display 226.

Figure 3:
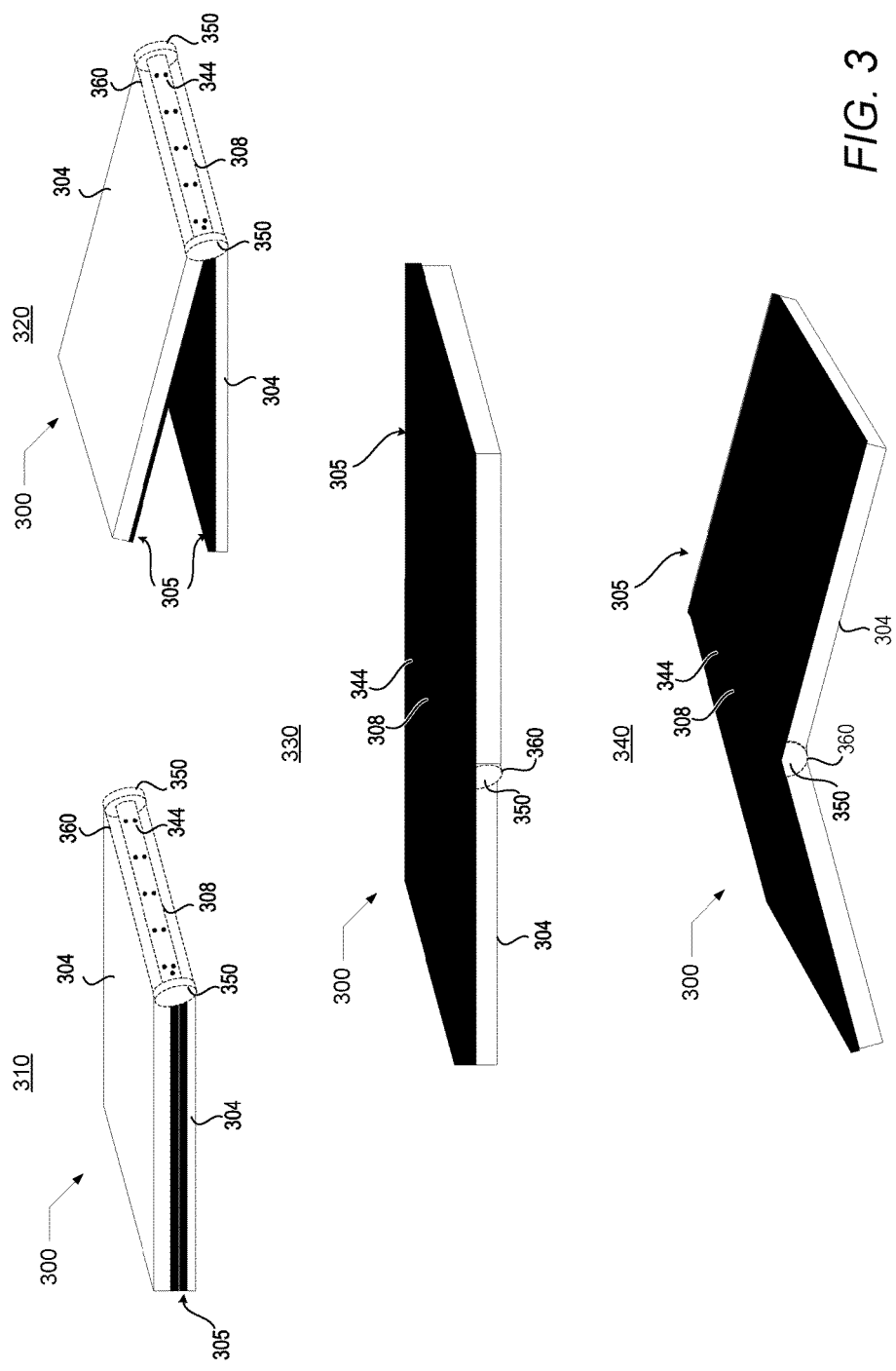
FIG. 3 illustrates an example foldable display, according to one or more embodiments.

FIG. 3 illustrates an example foldable electronic display associated with electronic device 300. In FIG. 3, electronic device 300 is presented in four positional arrangements, first position 310, second position 320, third position 330, and fourth position 340. Electronic device 300 is similar to and/or can be representative of DPS 100 or mobile device 200. Electronic device 300 is a hinged device having display 305 encased within device casing 304. Casing includes hinge area 360. The four positional arrangements illustrated in FIG. 3 represent the ability of electronic device 300 or display 305 to be positioned and/or maneuvered into a range of angles about hinge area 360. In one embodiment, hinge area 360 enables the coupling of two segments of display together at a hinge. In another embodiment, hinged area 360 enables one segment to fold at and/or around hinge area 360. As shown, electronic device 300 includes thermal element 308. Thermal element 308, similar to thermal element 274 or 275 (FIG. 2B), is connected to or in close proximity to hinge area 360.

Display controller 240 (or 140 of FIG. 1) is communicatively coupled to electronic device 300 and operates as the control module for display 305. Display controller 240 enables the functionalities of DRM 242. For example, DRM 242 (not shown in FIG. 3) enables an increase of the temperature at thermal element 308 in one or more embodiments. Thermal element 308 is a heat generating subsystem capable of applying an increase in the temperature associated with at least one predetermined area of display 305. Additionally, display controller 240 includes a detection module, or position sensor 350, that identifies when display 305 is placed in an angled position. In response to display 305 being placed in the angled position, timer 252 (FIG. 2B) monitors a time duration during which display 305 is in the angled position. In response to display 305 being in the angled position, a temperature measuring component, temperature sensor 344, measures and reports a temperature associated with at least one predetermined area of display 305 while display 305 is in the angled position.

In one embodiment, DRM 242, or an associated storage device, stores at least one viscoelastic behavior of at least one polymeric component associated with display 305. In one example, the viscoelastic behavior is received as relaxation modulus curves for the at least one polymeric component. The viscoelastic behavior defines how the polymer will react at a specific temperature. DRM 242 utilizes known viscoelastic behavior of the at least one polymeric component to determine the degree of deformation to at least one polymer associated with display 305, particularly at the hinged/bendable segments of display 305. DRM 242 may store the relaxation modulus curves to determine a target relaxation time and temperature needed to overcome a semi-permanent deformation.

FIG. 3 illustrates four example positions: first position 310, second position 320, third position 330, and fourth position 340. In FIG. 3, first position 310 displays electronic device 300 in a closed position. First position 310 is representative of a substantially zero-degree angle, at which a maximum convex bend of the display occurs. In first position 310, at least one area of display 305 is positioned adjacent to a second area of display 305. First position 310 illustrates electronic device 300 folding at or near hinge area 360. Second position 320 illustrates electronic device 300 in an acute angle between 0-90 degrees. The positional arrangement of second position 320 represents when display device 305 is in an angle that promotes a bend, and more specifically an inward/forward bend, forming a semi-permanent deformation in display 305. Third position 330 illustrates electronic device 300 in an open position. When electronic device 300 is in third position 330, display 305 is in the most horizontal position possible, with little or no bend, thus minimizing any potential deformation. Fourth position 340 illustrates electronic device 300 in an extended position. In fourth position 340, display 305 is in a positional arrangement that promotes a bend, and more specifically an outward/reverse bend, also forming a semi-permanent deformation in display 305.

The display positions illustrated in FIG. 3 are for example only. It is understood that display 305 is operable to bend/fold at any angle. Additionally, the position of hinge area 360 is only for example. It is understood that hinge area 360 may be located at any area associated with display 305. The fold and/or bend associated with display 305 may not necessarily be associated with an electronic device that opens and closes. Instead, semi-permanent deformation of display 305 may be associated with a slight bend/flex of display 305.

In operation, semi-permanent deformation occurs after display 305 has been in an angled position for a predetermined time duration. DRM 242 determines the degree of semi-permanent deformation of display 305 according to the time duration in which display 305 is in an angled position. The degree of deformation increases with the length of time and the amount of bend associated with the predetermined area. When a predetermined time duration, associated with the time duration in which display 305 is in the angled position elapses, and display 305 returns to third position 330, DRM 242 triggers the increase in temperature at the heat generating area to counter the semi-permanent deformation.

In one embodiment, display controller 240, in communication with display 305, receives a time duration and measured temperature, as detected by timer 252 and temperature sensor 344. The time duration and measured temperature are detected in response to display 305 being in the angled position, for example first position 310, second position 320, or fourth position 340. In response to display 305 being in a horizontal position, such as third position 330, display controller 240 determines a current value/amount of semi-permanent deformation associated with a predetermined area of display 305. DRM 242 triggers an increase in temperature at the heat generating area, via thermal element 308, to counter the semi-permanent deformation at the predetermined area of display 305. Thermal element 308 dynamically applies a calculated temperature to the predetermined area of display 305 for a calculated length of time. The length of time is calculated based on (i) the time duration in which display 305 is in the angled position and (ii) the measured temperature range of display 305 when in the angled position. In the current example, display 305 includes at least one polymer layer and the determined length of time is a relaxation time associated with a stress relaxation modulus value retrieved from stress relaxation data associated with the at least one polymer layer when heated at a selected temperature. The selected temperature is one of a calculated temperature and a dynamically selected temperature. The temperature may be calculated or dynamically selected for display 305 according to a preference of recovery time dynamically selected or defined by a user or manufacturer of display 305.

In one embodiment, electronic device 300 can be placed in anyone of various positions, which include first position 310, second position 320, and fourth position 340 for a respective time period. Position sensor 350 identifies when display 305 is in any one or more of first position 310, second position 320, and fourth position 340. In response to display 305 being placed in any one or more of first position 310, second position 320, and fourth position 340, timer 252 monitors the time durations during which display 305 is in the different angled positions, and timer 252 reports the time durations to DRM 242. In this embodiment, temperature sensor 344 detects and monitors the ambient temperature associated with at least one corresponding area of display 305. Temperature sensor 344 reports the temperature/temperature range to DRM 242. DRM 242 stores the time duration and monitored ambient temperature range. Temperature, time, and stress incurred at each position impacts the semi-permanent deformation sustained by an area of display 305. In response to detecting the change in angles for display 305, DRM 242 utilizes the average of the angles detected with respect to time positioned at each angle, and the average temperature to help determine an amount of heat and/or time to apply the heat. Accordingly, heat is generated to the predetermined area of display 305 for a predetermined length of time to counter the semi-permanent deformation incurred by display 305.

In another example, position sensor 350 identifies when display 305 is placed in third position 330 and reports the positional arrangement to DRM 242. In response to display 226 moving into third position 330, DRM 242 receives the measured temperature range and time duration recorded while display 305 was in one or more of the first, second, and/or fourth positions. DRM 242 utilizes current and past conditions, polymer properties, as well as endured physical load while display 305 was in one or more of the first position 310, second position 320, and fourth position 340 to calculate the level of semi-permanent deformation associated with a predetermined area of display 305. More specifically, DRM 242 utilizes the time duration, ambient temperature, known viscoelastic behavior, endured strain and stress (determined by imbedded strain gauges and force sensing) associated with display 305 while display 305 is in one or more of the angled positions. DRM 242 calculates the target temperature and length of time, or polymer relaxation time, needed to overcome the semi-permanent deformation at the predetermined area of display 305. DRM 242 triggers thermal element 308 to dynamically apply the determined target temperature to the predetermined area of display 305, for the determined length of time, in order to overcome the semi-permanent deformation.

In an alternate embodiment, DRM 242 receives a user-defined length of time in which to complete the process of reversing the semi-permanent deformation. In response to receipt of the user-defined length of time, DRM 242 dynamically selects a target temperature and heat generation rate, respective of the viscoelastic behavior, which will counter the semi-permanent deformation associated with display 305. According to one aspect, the time it takes to relax the imposed stresses on display 305 is governed by at least the relaxation time of the polymer associated with display 305. High temperatures correlate to shorter molecular relaxation times and low temperatures correlate to longer relaxation times. Thermal element 308 dynamically generates the selected temperature that corresponds to the polymer and the user-defined length of time. In response to heating display 305 at the predetermined area, DRM 242 monitors the decreasing stress, or stress relaxation of display 305 via one or more stress sensors or strain gauges (described further in the discussion in FIG. 5). When the stress relaxation value of display 305 reaches an empirically-determined, configurable threshold, thermal element 308 discontinues applying heat to the at least one predetermined area of display 305.

In one embodiment, temperature sensor 344 dynamically monitors the ambient temperature at a predetermined area of display 305. DRM 242 determines the semi-permanent deformation associated with display 305. Thermal element 308 generates a temperature that is a calculated temperature increase above the ambient temperature. In response to display 305 being in third position 330, DRM 242 enables thermal element 308 to generate an increase in temperature to heat a predetermined area of display 305 to the calculated temperature above the detected ambient temperature. Thermal element 308 applies heat to at least one predetermined area of display 305. The target temperature to apply to the at least one predetermined area of display 305 is calculated with respect to the target heat application period available to reverse the semi-permanent deformation experienced by display 305. The target heat application period may be one of a time duration that is: (i) programmed during manufacturing of electronic device 300; (ii) defined by a user; and (iii) dynamically determined by DRM 242 with respect to historical data providing frequency of use of electronic device 300 during a time of the day.

In another embodiment, the temperature, generated by thermal element 308, is applied to the semi-permanent deformation when display 305 is in third position 330 and display 305 is not in use. DRM 242 isolates thermal element 308 from display 305 when electronic device 300 is in use and when display 305 is in any one of first position 310, second position 320, and fourth position 340.

In still another embodiment, safety attributes are engaged to mitigate heat damage to electronic device 300 and more specifically display 305. Thermal element 308 is isolated from at least one of display 305 and hinge area 360 while at least one of (i) display 305 is in use and (ii) display 305 is not in a fully open state. Isolating thermal element 308 when display 305 is in use will eliminate inadvertent activation of the heat generating subsystem during the use of display 305. Additionally, isolating thermal element 308 when display 305 is not in a fully open/horizontal state eliminates heating a folded display 305 which would further promote semi-permanent deformation of display 305. In at least one embodiment, thermal element 308 is disengaged when the temperature measured of at least one area of display 305 reaches a configurable threshold.

Figure 4:
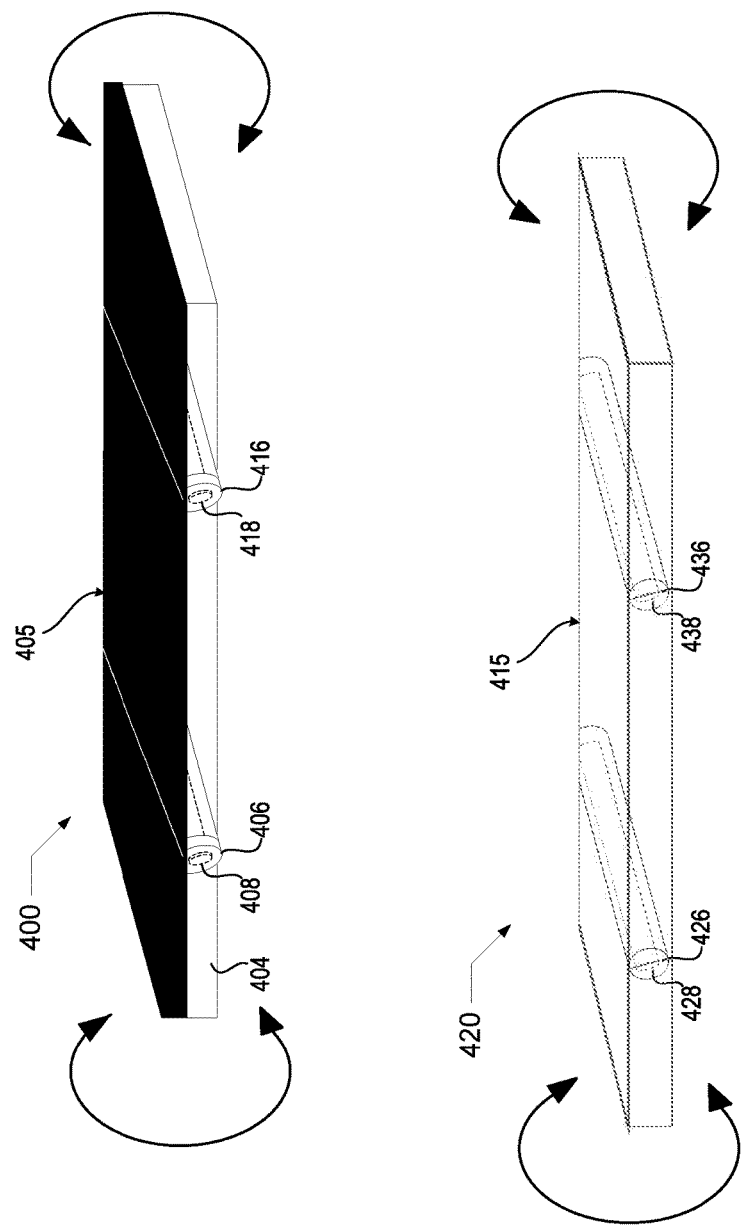
FIG. 4 illustrates another example foldable display, in accordance with one or more embodiments.

Now turning to FIG. 4, which illustrates two depictions of an electronic device (400 and 420) that encompasses characteristics and positional abilities similar to electronic device 300 discussed in FIG. 3. However, each electronic device 400 and 420 illustrate the display with an additional hinge area. More specifically, electronic device 400 includes display 405, device casing 404, first hinge area 406, first thermal element 408, second hinge area 416, and second thermal element 418. Electronic device 420 includes display 415, first hinge area 426, first thermal element 428, second hinge area 436, and second thermal element 438.

In one embodiment, first hinge area 406 and second hinge area 416 are positioned in at least two areas of display 405. First hinge area 406 and second hinge area 416 are respectively associated with thermal element 408 and thermal element 418. Display 405 bends, flexes, and/or folds near hinge area 406 and second hinge area 416. Display 405 is capable of flexing (i) inward, in a movement that rotates the outer edges of electronic device 400 towards display 405, and (ii) outward, in a movement that rotates the outer edges of electronic device towards device casing 404. The inward flex may create a concave semi-permanent deformation in one or more areas in proximity to first hinge area 406 and second hinge area 416. The outward flex may create a convex semi-permanent deformation in one or more areas in proximity to first hinge area 406 and second hinge area 416. First thermal element 408 and second thermal element 418 respectively generate a predetermined increase in temperature to an area in proximity to first hinge area 406 and second hinge area 416 to relax the semi-permanent deformation associated with display 405.

In an alternate embodiment, electronic device 420 does not include a device casing. First thermal element 428 and second thermal element 438 are coupled to display 415. Display 415 is capable of flexing (i) inward, in a movement that rotates the outer edges of electronic device 420 towards the top layer of display 415, and (ii) outward, in a movement that rotates the outer edges of electronic device 420 towards the bottom layer of display 415. The inward flex may create a concave (top layer of display 415) and convex (bottom layer of display 415) semi-permanent deformation in one or more areas in proximity to first hinge area 426 and second hinge area 436. The outward flex may also create a concave (bottom layer of display 415) and convex (top layer of the display 415) semi-permanent deformation in one or more areas in proximity to first hinge area 426 and second hinge area 436. In this configuration, first thermal element 428 and second thermal element 438 respectively apply a predetermined increase in temperature to the predetermined areas of display 415 in proximity to hinge area 426 and second hinge area 436 to relax the semi-permanent deformation in the top and bottom surface of display 415.

Figure 5:
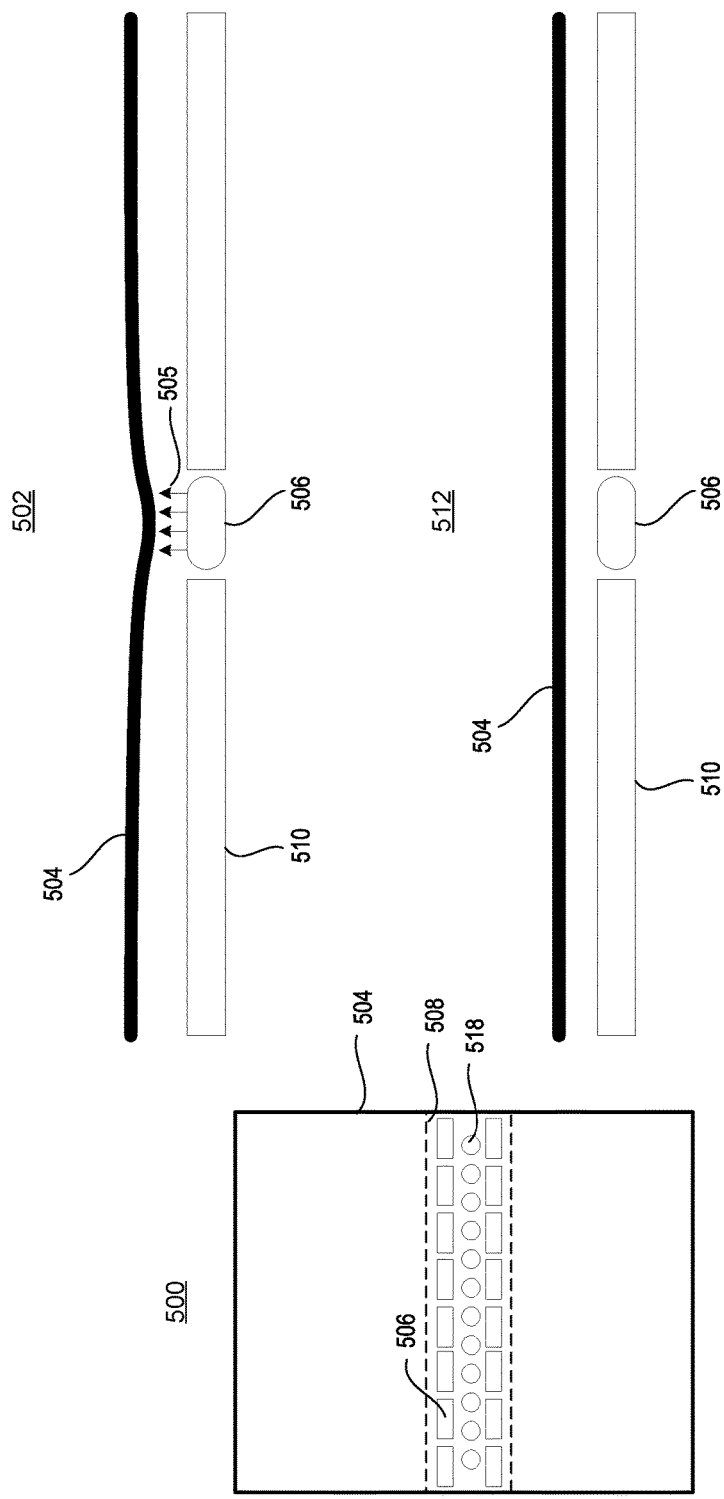
FIG. 5 illustrates an example foldable display coupled to a heat generating subsystem that is configured to apply heat to an area of the foldable display, according to one or more embodiments.

FIG. 5 illustrates an example foldable display 504 (similar to foldable display 226 of FIG. 2) associated with a thermal element (506) that is configured to apply heat to an area of foldable display 504. FIG. 5 includes top down view 500, first view 502, and second view 512. Top down view 500 includes a top down illustration of foldable display 504 and hinge area 508. Thermal element 506 and strain gauge 518 are coupled in close proximity to hinge area 508. First view 502 and second view 512 include an example cross-sectional view of foldable display 504, device casing 510, and thermal element 506.

In the example of first view 502, foldable display 504 is illustrated with a concave semi-permanent deformation in close proximity to hinge area 508. In response to foldable display 504 being in an open and flat position, for example third position 330, DRM 242 enables thermal element 506 to generate heat 505 to the concave semi-permanent deformation at the predetermined area of foldable display 504. In one embodiment, heat 505 is generated to a calculated temperature to increase the mobility of the polymer chains associated with at least one polymer comprised within foldable display 504. Increasing the mobility of the polymer chains enables the applied heat 505 to counter the semi-permanent deformation at the predetermined area of foldable display 504, relaxing the predetermined area to a less deformed state. In one embodiment, the temperature increase is applied for a calculated length of time. In an alternate embodiment, strain gauge 518 is connected to foldable display 504 to monitor the stress relaxation associated with foldable display 504. With this alternate embodiment, the temperature increase is applied while strain gauge 518 measures the force, pressure, tension, or weight associated with foldable display 504. When the residual stress and strain associated with an area of foldable display 504 is below a pre-established threshold, then steps to recover deformation are not necessary, or can be postponed.

The example of second view 512 illustrates that foldable display 504 has recovered from the semi-permanent deformation illustrated in first view 502. The increase in temperature generated by thermal element 506 to foldable display 504 counters the semi-permanent deformation experienced by foldable display 504. In response to strain gauge 518 detecting that foldable display 504 has achieved a residual stress level below a predetermined threshold, heat 505, generated by thermal element 506, is discontinued.

Figure 6:
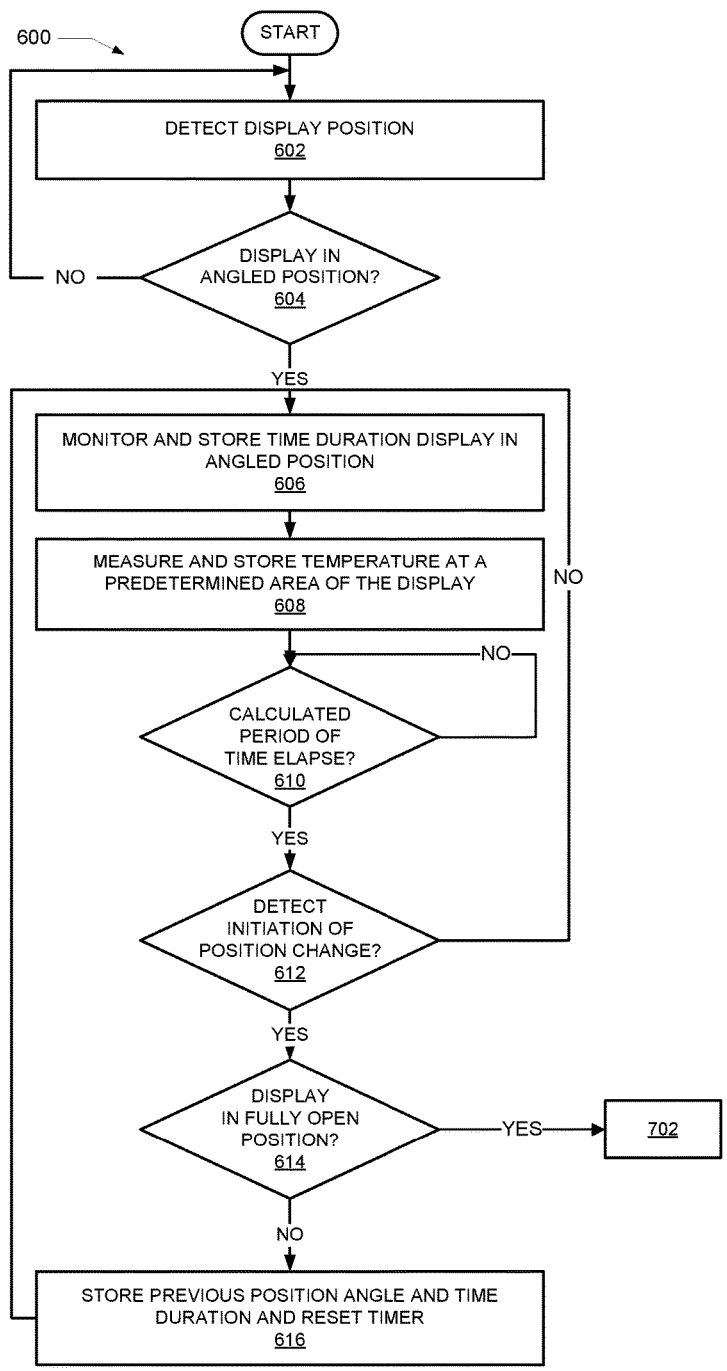
FIG. 6 is a flow chart illustrating a method for determining whether to engage a heat generating subsystem to heat a predetermined area of the foldable display, in accordance with one or more embodiments.
Figure 7:
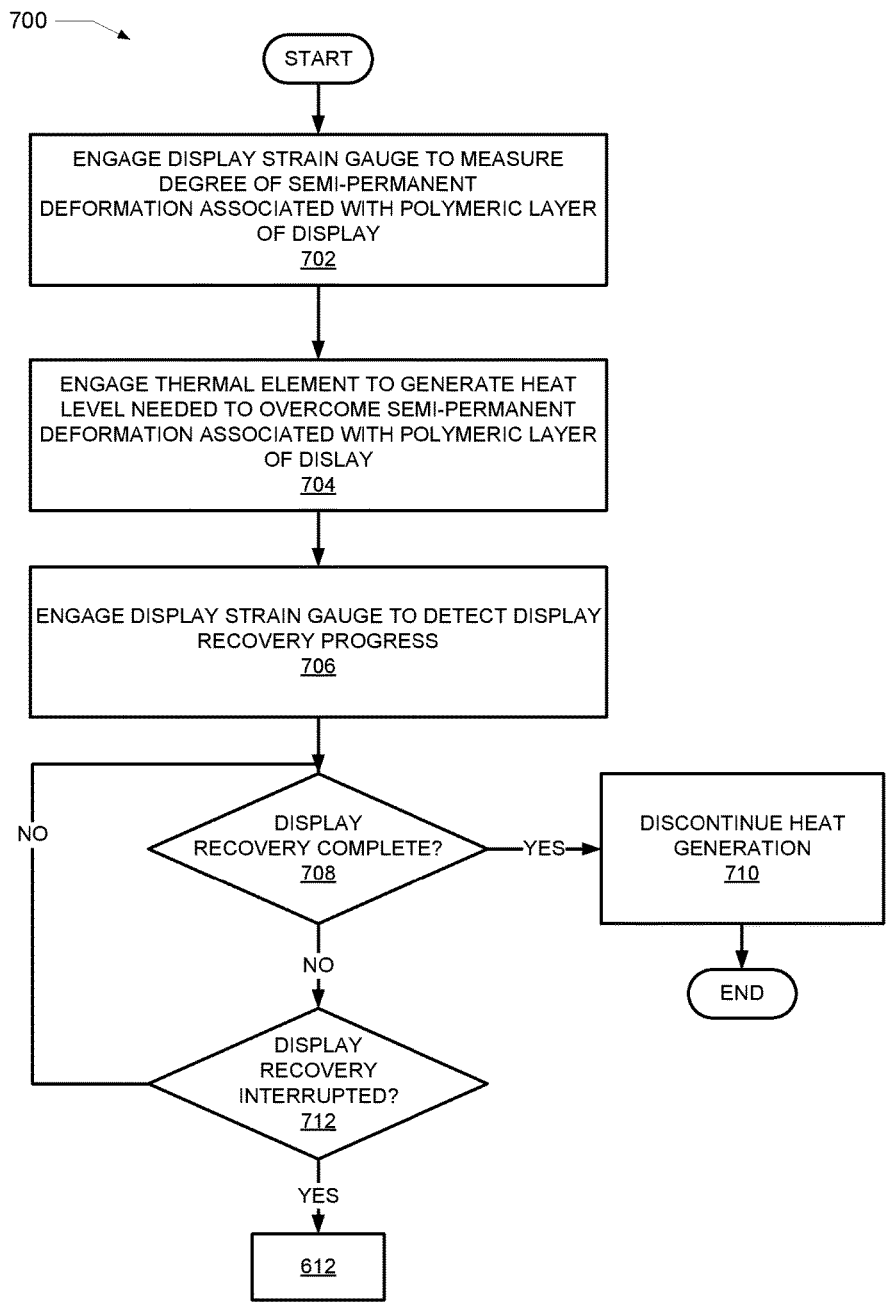
FIG. 7 is a flow chart illustrating a method for engaging the heat generating subsystem to heat a predetermined area of the foldable display, in accordance with one or more embodiments.

Referring now to FIG. 6 and FIG. 7. FIG. 6 provides a method for determining whether to engage thermal element 274 (FIG. 2) to heat a predetermined area of display 226 (FIG. 2), in accordance with one or more embodiments of the present disclosure. FIG. 7 provides a method for engaging thermal element 274 (FIG. 2) to heat a predetermined area of the foldable display, and monitoring the recovery of display 226. Aspects of the methods are described with reference to the components of FIGS. 1-5. Several of the processes of the method provided in FIG. 6 and FIG. 7 can be implemented by a processor (e.g., processor 205) executing software code of DRM 242 associated with display controller 240 within a generic data processing system 100 (FIG. 1) or mobile device 200 (FIG. 2). In the following method processes described in FIG. 6 and FIG. 7, processor 205 executes DRM 242 to perform the steps described herein.

Method 600 commences at the start block, then proceeds to block 602. At block 602 the method engages position sensor 250 to detect the position of display 226. A decision is made at block 604 whether display 226 is placed in an angled position, for example first position 310, second position 320, or fourth position 340. In response to the display 226 not being placed in the angled position, the process returns to block 602. In response to display 226 being placed in the angled position, the process continues to block 606. At block 606, DRM 242 monitors and stores the time duration display 226 is in the angled position. At block 608, temperature sensor 244 measures the ambient temperature at a specific area of display 226, and DRM 242 stores the detected ambient temperature values. At block 610 a decision is made whether a calculated period of time has elapsed. The period of time is calculated based on the temperature and stress endured by display 226 while in the angled position. In response to the calculated period of time not elapsing, the process returns to block 610. In response to the calculated period of time elapsing, the process continues to block 612. At block 612 a determination is made whether the initiation of a position change associated with display 226 has been detected. In response to the initiation of a position change not being detected, the process returns to block 606. In response to the initiation of a position change being detected, the method continues to block 614. At block 614 a determination is made whether display 226 is in a fully open position. The process returns to block 606 in response to display 226 not being in a fully open position. In response to display 226 being in a fully open position, the process continues to block 702.

Method 700 commences at the start block, then proceeds to block 702. At block 702 the method engages strain gauge 518 to measure the degree of semi-permanent deformation associated with at least one polymeric layer of display 226. The method engages thermal element 274, at block 704, to generate the heat at the level and for the duration, or heat application period, needed to overcome the semi-permanent deformation associated with the polymeric layer of display 226. At block 706 the method engages strain gauge 518 to detect the recovery progress of the polymeric layer associated with display 226. A determination is made at block 708 whether the recovery (i.e., reversal of the semi-permanent deformation) of the polymeric layer associated with display 226 is complete. In response to the recovery being complete, the process continues to block 710. In response to the recovery not being complete, the process continues to block 712. At block 712, a determination is made whether the recovery of display 226 experienced an interruption, for example, the display position change or power was discontinued to thermal element 274. In response to the recovery of display 226 not being interrupted, the process returns to block 708. In response to the recovery of display 226 being interrupted, the process returns to block 612. At block 710 the method discontinues heat generation by thermal element 274. The process concludes at the end block.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An electronic device, comprising:
a display;
at least one hinge associated with the display;
a temperature measuring component that measures and reports a temperature associated with at least one area of the display while the display is in an angled position;
a heat generating subsystem having a thermal element and capable of applying an increase in temperature associated with the at least one area of the display; and
a control module in communication with the temperature measuring component and the heat generating subsystem and which includes:
a detection module that identifies when the display is placed in an angled position;
a timer that, in response to the display being placed in the angled position, monitors a time duration during which the display is in the angled position;
wherein the control module: in response to the display being in the angled position, receives the time duration and measured temperature; in response to the display being placed in a horizontal, fully-opened position after being in the angled position, calculates a semi-permanent deformation associated with the at least one area of the display; and triggers an increase in temperature at the at least one area of the display to counter the semi-permanent deformation at the at least one area of the display.

2. The electronic device of claim 1, wherein the increase in temperature at the at least one area of the display is triggered when a time duration, associated with the time duration the display is in the angled position, elapses.

3. The electronic device of claim 1, wherein the heat generating subsystem includes a thermal element proximate to the at least one area of the display.

4. The electronic device of claim 3, wherein the thermal element dynamically applies a selected temperature to the at least one area of the display for a calculated length of time.

5. The electronic device of claim 4, wherein the display includes at least one polymer layer and the calculated length of time is a relaxation time associated with a stress relaxation modulus value retrieved from stored stress relaxation data of the at least one polymer layer when heated at the selected temperature.

6. The electronic device of claim 4, wherein the selected temperature is at least one of a calculated temperature and a dynamically selected temperature.

7. The electronic device of claim 1, wherein the temperature is applied to the semi-permanent deformation when the display is in a fully open state and the display is not in use.

8. The electronic device of claim 1, wherein the heat generating subsystem comprises a heat generating source that is isolated from at least one of the display and the hinge while at least one of (i) the display is in use and (ii) the display is not in a fully open state.

9. A method comprising:
detecting, via a detection module, when a display, having at least one hinge area that bends or folds, is placed in an angled position; and
in response to the display being placed in the angled position with respect to a device casing:
measuring a temperature associated with at least one area of the display while the display is in the angled position;
monitoring a time duration during which the display is in the angled position;
in response to the display remaining in the angled position for greater than a calculated period of time, measuring a degree of semi-permanent deformation associated with the at least one area of the display; and
triggering an increase in temperature at the at least one area of the display to counter the degree of semi-permanent deformation.

10. The method of claim 9, further comprising:
triggering the increase in temperature in response to an elapsed amount of time the display is in the angled position being greater than the calculated period of time.

11. The method of claim 9, further comprising:
monitoring characteristics including at least one of the temperature, an applied strain, and stress at the at least one area of the display; and
calculating the temperature and a corresponding temperature application time required to counter the degree of semi-permanent deformation at the at least one area of the display based on the monitored characteristics.

12. The method of claim 9, wherein the display is associated with at least one polymer layer.

13. The method of claim 9, wherein a thermal element, associated with at least one of the display and the at least one hinge, is engaged to apply the temperature to the at least one area of the display.

14. The method of claim 9, further comprising:
identifying when the display is in a fully open state and is inactive; and
increasing the temperature only in response to the display being in the fully open state and is inactive.

15. The method of claim 9, wherein a fold is created in the display when at least one of the hinge and display is in an angled position.

16. The method of claim 9, wherein the display is in an angled position when the display is at least one of a closed and a partially open position.

17. The method of claim 9, wherein a thermal element is coupled to at least one of the hinge and the display, and the method comprises autonomously isolating the thermal element from the display in response to at least one of (i) the display being in use and (ii) the display being in a non-fully open state.

18. A computer program product comprising:
a computer readable storage device; and
program code on the computer readable storage device that when executed within a processor associated with a device, the program code enables the device to provide a functionality of:
detecting when a display that is capable of being placed in an angled position via at least one hinge area, is in the angled position; and in response to the display being placed in the angled position with respect to a device casing:
- monitoring a time duration during which the display is in the angled position;
- measuring a temperature associated with at least one area of the display while the display is in the angled position;
- in response to the display remaining in the angled position for greater than a calculated period of time, measuring a degree of semi-permanent deformation associated with the at least one area of the display; and
- triggering an increase in temperature at the at least one area of the display to counter the degree of semi-permanent deformation.

19. The computer program product of claim 18, further comprising:
monitoring at least one of the temperature, an applied strain, and stress at the at least one area of the display to derive the temperature and a corresponding temperature application time to counter the degree of semi-permanent deformation at the at least one area of the display; and
triggering the increase in temperature in response to an elapsed amount of time associated with the calculated period of time the display is in the angled position.

20. The computer program product of claim 18, further comprising:
- engaging a thermal element, associated with at least one of the display and the at least one hinge, to apply the temperature to the at least one area of the display;
- increasing the temperature at a time when the display is in a fully open state, and the display is inactive; and
- autonomously isolating the thermal element from the display in response to at least one of (i) the display being in use and (ii) the display being in a non-fully open state.

* * * * *